United States Patent [19]

Omori et al.

[11] Patent Number: 4,842,966
[45] Date of Patent: Jun. 27, 1989

[54] BATTERY HOLDER MECHANISM

[75] Inventors: Makoto Omori; Toshinobu Banjo; Shigeo Onoda, all of Itami, Japan

[73] Assignee: Mitsubishi Denki Kabushiki Kaisha, Japan

[21] Appl. No.: 158,733

[22] Filed: Feb. 23, 1988

[30] Foreign Application Priority Data

Mar. 31, 1987 [JP] Japan .................................. 62-79922

[51] Int. Cl.⁴ ......................... H01M 2/10; G04B 1/00; G04C 3/00
[52] U.S. Cl. ...................................... 429/96; 429/100; 439/627; 368/204; 364/708; 307/150; 361/392
[58] Field of Search ................. 429/9, 96, 100; 320/2; 368/203, 204, 88; 307/150; 439/627, 628, 629, 626; 364/708; 361/334, 392

[56] References Cited

U.S. PATENT DOCUMENTS 3,945,193  3/1976  Yasuda et al. .
4,269,908  5/1981  Stemme .................. 429/98
4,435,088  3/1984  Dorfman ................. 368/88
4,718,742  1/1988  Itoh et al. ............. 439/627

Primary Examiner—A. D. Pellinen
Assistant Examiner—David Osborn
Attorney, Agent, or Firm—Leydig, Voit & Mayer

[57] ABSTRACT

A battery holder mechanism for holding a battery in an electronic device having a package has a battery holder body adapted to be received in a receiving hole of the package. The battery holder body has a circular-arc portion extending along the circumferential direction of the battery. First and second supporting projection project from the inner peripheral edges of the circular-arc portion and support the battery from both sides. A supporting projecting portion disposed in the package within the receiving hole at a position corresponding to a circumferential interval between the second supporting projection so as to support the battery from the same side as the second supporting projection when the battery holder body is inserted in the battery receiving hole. Engagement pauls resiliently lock the battery holder body within the battery receiving hole. The battery is held by the projections from both sides, so the vertical displacement of the battery can be restricted.

9 Claims, 3 Drawing Sheets

BATTERY HOLDER MECHANISM

BACKGROUND OF THE INVENTION

The present invention relates to a battery holder mechanism for holding a battery in a device such as an IC card which may be used as a game card, or in thin desk-top calculators, thin watches and the like.

An example of a device having a conventional battery holder mechanism as used in an IC card will be described with reference to FIGS. 1 to 3. As shown in FIG. 1, an IC card 1 has a package 2 which receives therein a semiconductor device (not shown) including thin semiconductor elements, electronic components, and a battery. The package 2 comprises a frame 3 and panels 4 adhesion bonded to the upper and lower sides of the frame 3 so as to provide covers. The frame 3 and panels 4 are made of an insulating material such as a synthetic resin. A battery receiving hole 5 is formed on the rear side of the package 2 so that a battery holder body 6 holding a battery, as shown in FIG. 2, can be inserted into the hole 5 by being pushed in the direction indicated by the arrow A shown in FIG. 1.

FIG. 2 is a plan view of the battery holder body 6 as received within the package 2. The battery holder body 6 is also made of a synthetic resin and holds a flat battery 10. When the battery holder body 6 is inserted into the receiving hole 5 of the frame 3, engagement pawls 6a on both sides of the battery holder body 6 engage with engagement recesses 3a of the frame 3 by springing outward into the recesses 3a by virtue of their resilience. The battery holder body 6 also has a circular-arc portion 6b extending in the circumferential direction of the battery 10, and a lower supporting projection 6c projecting radially inwardly from the lower side of the inner peripheral edge of the circular-arc portion 6b. The battery 10 is supported from below by the lower supporting projection 6c, as shown in FIG. 3 which shows the lower supporting projection 6c, the battery 10, and the related members in section.

The IC card 1 which has the above-described battery holder mechanism is used, for instance, by inserting it into a connector of a card reader (not shown), thereby electrically connecting the card.

An IC card having the conventional battery holder mechanism, however, encounters the following problem. Namely, with this machine, the battery 10 is simply placed on the lower supporting projection 6c of the battery holder body 6 and is therefore loosely supported. This arrangement is disadvantageous in that there is a risk of the battery 10 colliding with the upper panel 4 when the card 1 is turned upside down, creating a burden on the panel 4. In particular, if the card 1 happens to be dropped, the battery 10 can collide heavily against the panels 4, leading to destruction of the components of the card 1.

SUMMARY OF THE INVENTION

It is therefore an object of the present invention to provide a battery holder mechanism for a thin electronic device, which is capable of holding a battery in a receiving hole of a package of the device by supporting the battery from both the upper and lower sides, thereby restricting vertical displacement of the battery, and which is thus capable of preventing the battery from creating any burden on panels of the package, thereby preventing destruction of the battery and other related components.

According to one aspect of the present invention, there is provided a battery holder mechanism for holding a battery in a battery receiving hole in a package of an electronic device, comprising: a battery holder body having a circular-arc portion which extends in the circumferential direction of the battery when the battery is held by the battery holder body, first supporting projection means projecting radially inwardly from one side of the inner peripheral edge of the circular-arc portion so as to support the battery from one side thereof, and second supporting projection means projecting radially inwardly from the other side of the inner peripheral edge of the circular-arc portion so as to support the battery from the other side thereof, the second supporting projection means extending only partly along the circular-arc portion to provide a circumferential interval through which the battery can be inserted into the battery holder body; a supporting projecting portion disposed in the package within the receiving hole at a position corresponding to the circumferential interval between the second supporting projection means so as to support the battery from the other side thereof when the battery holder body is inserted in the battery receiving hole; and resilient stop means for resiliently locking the battery holder body within the battery receiving hole.

By virtue of this arrangement of the battery holder mechanism of the present invention, the battery is held from both sides by the first and second supporting projection means of the battery holder body and the supporting projecting portion of the package, and is thus kept from being vertically displaced.

According to another aspect of the present invention, there is provided a battery holder mechanism for holding a battery in a battery receiving hole in a package of an electronic device, comprising: a battery holder body having a resilient circular-arc portion extending along at least one half of the circumference of the battery when the battery is held by the battery holder body, first supporting projection means projecting radially inwardly from one side of the inner peripheral edge of the circular-arc portion so as to support the battery from one side thereof, and second supporting projection means projecting radially inwardly from the other side of the inner peripheral edge of the circular-arc portion so as to support the battery from the other side thereof; and resilient stop means for resiliently locking the battery holder body within the battery receiving hole.

With this arrangement of the battery holder mechanism of the present invention, the circular-arc portion of the battery holder body is resilient. Therefore, the battery can be inserted into the battery holder body by expanding the circumferential gap between the circumferential ends of the circular-arc portion against its resilience, and the battery can be held from both sides by the first and second projections. With this arrangement, therefore, no supporting projection portion need be provided on the package.

DESCRIPTION OF THE PREFERRED EMBODIMENTS

Figure 1:
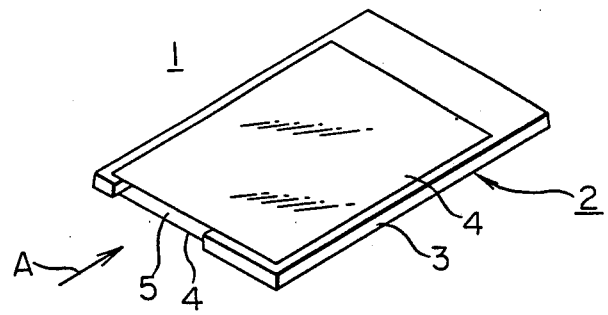
FIG. 1 is a perspective view of an IC card having a conventional battery holder mechanism.
Figure 2:
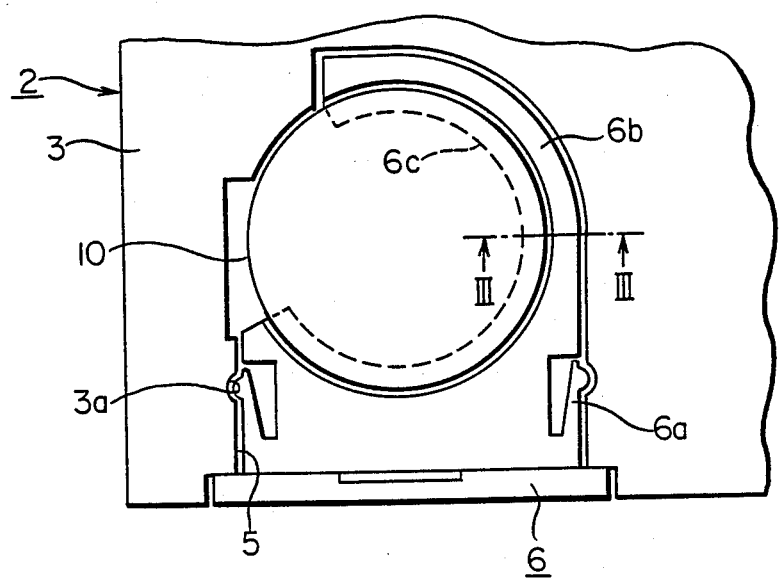
FIG. 2 is a plan view of a battery holder body of the conventional battery holder mechanism, the battery holder body being shown as received in the package of the memory card shown in FIG. 1, with the upper panel of the package being removed.
Figure 3:
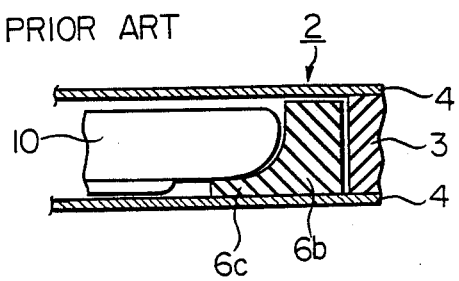
FIG. 3 is a fragmentary sectional, view taken along the line III—III shown in FIG. 2.

The preferred embodiments of the present invention will be described hereunder with reference to the drawings. In these drawings, the same or corresponding reference numerals are used to denote the same or corresponding components or elements.

Figure 4:
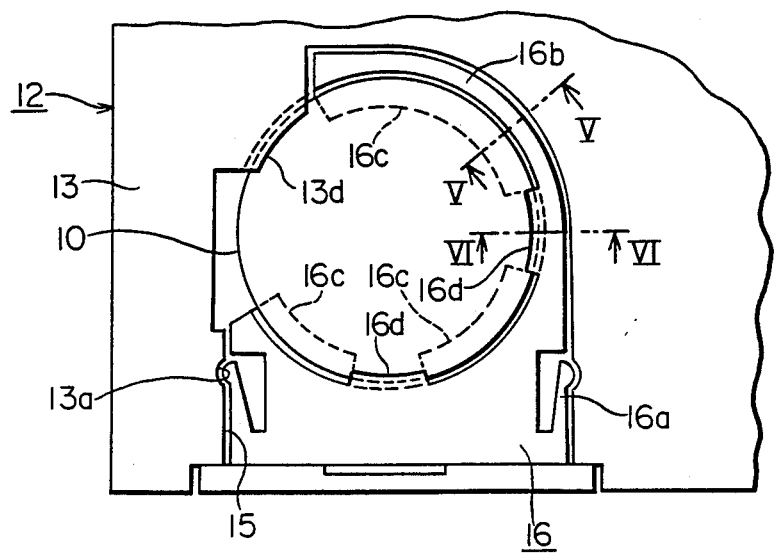
FIG. 4 is a plan view of a battery holder body of a battery holder mechanism in accordance with the present invention as mounted inside the package of a memory card with the upper panel of the package being removed.
Figure 5:
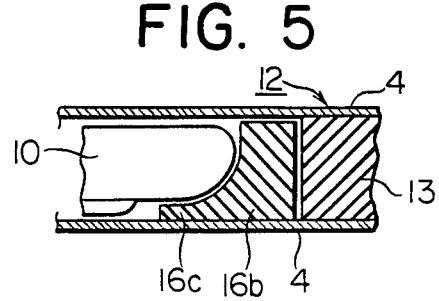
FIG. 5 is a fragmentary sectional view taken along line V—V of FIG. 4.
Figure 6:
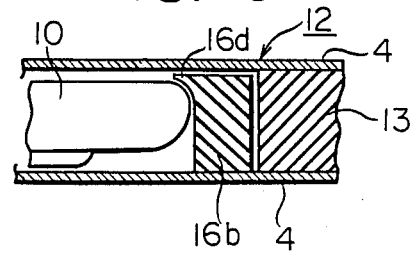
FIG. 6 is a fragmentary sectional view taken along the line VI—VI of FIG. 4.

FIGS. 4 to 6 illustrate a first embodiment of the present invention, in which an IC card, an example of a thin electronic device, incorporates a battery holder mechanism in accordance with the first embodiment of the present invention.

FIG. 5 is a plan view showing a battery holder body 16 as received in the battery receiving hole 15 of a package 12 of an IC card. The package 12 has nearly the same structure as the conventional package 12 shown in FIG. 1, and therefore only the portions of the package 12 adjoining the battery holder 16 have been illustrated in FIG. 4. The battery holder body 16 is made of an insulating material such as a synthetic resin and has engagement pawls 16a on both sides. When the battery holder body 16 is inserted into the battery receiving hole 15 formed in the frame 13 or the package 12, the engagement pawls 16a engage with engagement recesses 13a formed in the frame 13 by springing outward into these recesses 13a by virtue of the resilience of the pawls 16a.

The battery holder body 16 also has a circular-arc portion 16b, lower (first) supporting projections 16c, and upper (second) supporting projections 16d. The lower supporting projections 16c project radially inwardly from the lower side of the inner peripheral edge of the circular-arc portion 16b, as best shown in in FIG. 5, whereas the upper supporting projections 16d project radially inwardly from the upper side of the inner peripheral edge of the circular-arc portion 16b, as best shown in FIG. 6. These lower and upper supporting projections 16c and 16d are arranged alternately in the circumferential direction, as shown in FIG. 4. Therefore, when the battery 10 is inserted into the battery holder body 16, it can be held from below and above by these lower and upper supporting projections 16c and 16d of the battery holder body 16. The upper supporting projections 16d are circumferentially spaced from one another in such a manner as to provide a circumferential gap therebetween through which the battery can be inserted into the battery holder body 16 from one side of the battery holder body 16.

The inner wall of the frame 13 partly defining the receiving hole 15 for receiving the battery holder body 16 also has an upper supporting projecting portion 13d. The upper supporting projecting portion 13d projects inwardly at a portion of the inner wall which corresponds to the circumferential interval between the upper supporting projections 16d of the battery holder body 16. Therefore, when the battery 10 has been inserted into the battery holder body 16 and the battery holder body 16 has been inserted into the receiving hole 15, the battery 10 can be held from above by the upper supporting projecting portion 13d of the frame 13.

In this way, the battery 10 of the memory card 1 can be held from below and above alternately by the lower and upper supporting projections 16c and 16d of the battery holder body 16 and the upper supporting projecting portion 13d of the frame 13, thereby positively restricting displacement of the battery 10.

The arrangement of the lower and upper projections 16c and 16d of the battery holder body 16, and the upper supporting projecting portion 13d of the frame 13 may be different from that described above, so long as the battery 10 can be inserted into the battery holder body 16 from one side and be held from above and below, thereby restricting displacement of the battery held in the battery holder body 16 which is, in turn, received in the receiving hole 15 of the package 12.

Figure 7:
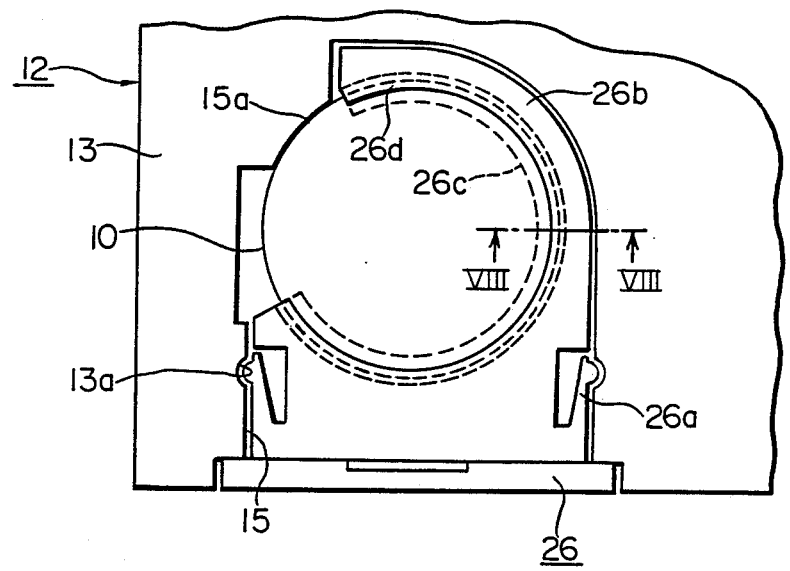
FIG. 7 is a plan view of a battery holder body of a battery holder mechanism in accordance with another embodiment of the present invention, the battery holder body being shown as received in a package, with the upper panel of the package being removed.
Figure 8:
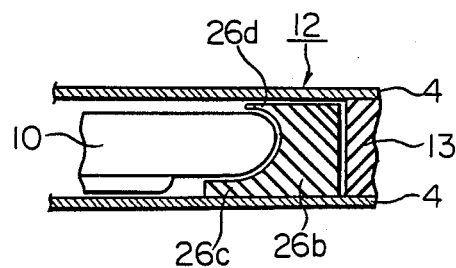
FIG. 8 is a fragmentary sectional view taken along the line VIII—VIII of FIG. 7.

FIGS. 7 and 8 illustrate another embodiment of the present invention. FIG. 7 is a plan view showing a battery holder body 26 of a battery holder mechanism in accordance with the second embodiment, which shows the battery holder body 26 as received in a package 12 having a frame 13. Similarly to the first embodiment, the battery holder body 26 is made of a synthetic resin and has engagement pawls 26a which, when the battery holder body 26 is inserted into a receiving hole 15 through the frame 13, engage with engagement recesses 13a of the frame 13 by springing outwardly into these recesses 13a by virtue of the resilience of the pawls 26a.

The battery holder body 26 has a circular-arc portion 26b, a lower supporting projection 26c, and an upper supporting projection 26d. Each of the lower and upper supporting projections projects from the lower or upper part of the inner peripheral edge of the circular-arc portion 26b and extends along the entire circumferential length of the circular-arc portion 26b. The circular-arc portion 26b and the lower and upper supporting projections 26c and 26d are all resilient. FIG. 8 shows these members 26b, 26c, and 26d in cross section.

In order to insert a battery 10 into the battery holder body 26, the battery 10 is inserted by expanding the circumferential gap between circumferential ends of the circular-arc portion 26b, and is held from below and above by the lower and upper supporting projections 26c and 26d, thereby restricting displacement of the battery 10. Therefore, the battery holder body 26, in which the battery 10 is thus held, is inserted into the receiving hole 15 through the frame 13.

According to this embodiment, the circular-arc portion 26b, and the lower and upper supporting projections 26c and 26d projecting from the inner peripheral edge of the circular-arc portion 26b extend over a circumferential length which is at least one half of the circumference of the battery 10. This arrangement ensures that the battery 10 is supported sufficiently by the lower and upper supporting projections 26c and 26d.

Therefore, in contrast with the previous embodiment, a projecting portion of the frame 13, such as that shown in FIG. 4, may be omitted if not required.

As shown in FIG. 7, the inner wall of the receiving hole 15 may be such that it has a portion 15a corresponding to the part of the battery 10 in the circumferential gap in the circular-arc portion 26b. With this arrangement, when the battery holder body 26 holding the battery 10 is received in the reception hole 15, that part of the battery 10 is supported laterally by the inner wall portion 15a.

Neither the lower or upper projections 26c and 26d need extend over the entire circumferential length of the circular-arc portion 26b, as long as they can hold the battery 10 in such a manner as to restrict its displacement. For instance, each of these projections 26c and 26d may have a plurality of spaced sections which are arranged in such a manner as to project from below and above alternately in the circumferential direction.

What is claimed is:

1. A battery holder mechanism comprising:
a battery holder body having a circular-arc portion which has an inner peripheral surface which extends partway along the circumference of a circle and which has two sides, first supporting projection means projecting radially inwardly from one of the sides of the inner peripheral surface of said circular-arc portion for supporting a battery at its periphery from one side thereof, and second supporting projection means projecting radially inwardly from the other of the sides of the inner peripheral surface of said circular-arc portion for supporting the battery at its periphery from a side opposite the one side thereof, said second supporting projection means extending only partway along said circular-arc portion to define a circumferential gap through which the battery can be inserted into said battery holder body;
a device having a receiving hole which receives said battery holder body and a battery which is carried thereby, said device having a supporting portion which projects into the receiving hole at a position corresponding to said circumferential gap and which is engageable with the battery at its periphery to support the opposite side of the battery when said battery holder body is inserted into the receiving hole; and
resilient stop means for resiliently locking said battery holder body within the receiving hole.

2. A battery holder mechanism according to claim 1, wherein each of said first and second supporting projection means comprises at least two projections, and said projections of said first and second supporting projection means are disposed alternately in the circumferential direction of said circular-arc portion.

3. A battery holder mechanism comprising:
a battery holder body having a resilient circular-arc portion extending for at least 180 degrees along a circle and having an inner peripheral surface which has two sides, first supporting projection means projecting radially inwardly from one of the sides of the inner peripheral surface of said circular-arc portion for supporting a battery from one side thereof, and second supporting projection means projecting radially inwardly from the other side of the inner peripheral surface of said circular-arc portion for supporting the battery from a side opposite the one side thereof; and
resilient stop means for resiliently locking said battery holder body with a battery receiving hole of a device into which said battery holder mechanism is inserted.

4. A battery holder mechanism according to claim 3, wherein each of said first and second supporting projection means comprises at least two projections, and said projections of said first and second supporting projection means are disposed alternately in the circumferential direction of said circular-arc portion.

5. A battery holder mechanism according to claim 3, further comprising lateral support means formed on an inner wall of the receiving hole for laterally supporting the peripheral portion of the battery where said circular-arc portion does not extend when said battery holder body is received in the battery receiving hole.

6. A battery holder mechanism according to claim 5, wherein each of said first and second supporting projection means comprises at least two projections, and said projections of said first and second supporting projection means are disposed alternately in the circumferential direction of said circular-arc portion.

7. A battery holder mechanism according to claim 5, wherein said lateral support means comprises a supporting projection for supporting said battery which is formed on the inner wall of the receiving hole.

8. A battery holder mechanism comprising:
a battery holder body having a resilient circular-arc portion extending for at least 180 degrees along a circle and having an inner peripheral surface which has two sides, first supporting projection means projecting radially inwardly from one of the sides of the inner peripheral surface of said circular-arc portion for supporting a battery from one side thereof, and second supporting projection means projecting radially inwardly from the other of the sides of the inner peripheral surface of said circular-arc portion for supporting the battery from a side opposite the one side thereof; and
resilient stop means for resiliently locking said battery holder body within a battery receiving hole of a device into which said battery holder mechanism is inserted, wherein each of said first and second supporting projection means extends over the entire circumferential length of the inner peripheral surface of said circular-arc portion.

9. A battery holder mechanism comprising:
a battery holder body having a resilient circular-arc portion extending for at least 180 degrees and less than 360 degrees along a circle and having an inner peripheral surface which has two sides, first supporting projection means projecting radially inwardly from one of the sides of the inner peripheral surface of said circular-arc portion for supporting a battery from one side thereof, and second supporting projection means projecting radially inwardly from the other of the sides of the inner peripheral surface of said circular-arc portion for supporting the battery from a side opposite the one side thereof;
resilient stop means for resiliently locking said battery holder body within a receiving hole of a device into which said battery holder mechanism is inserted; and
lateral support means formed on an inner wall of the receiving hole for laterally supporting the battery at a peripheral portion thereof where said circular-arc portion does not extend when said battery holder body is received in the receiving hole, wherein each of said first and second supporting projection means extends over the entire circumferential length of the inner peripheral surface of said circular-arc portion.

* * * * *